United States Patent [19]
Menegoli

[11] Patent Number: 6,084,364
[45] Date of Patent: Jul. 4, 2000

[54] USING DIFFERENT FREQUENCY CLOCKS TO CLOCK COUNTERS OF A DRIVER CIRCUIT AT SPIN-UP AND AT REGULATION

[75] Inventor: Paolo Menegoli, San Jose, Calif.

[73] Assignee: STMicroelectronics, Inc., Carrollton, Tex.

[21] Appl. No.: 09/130,297

[22] Filed: Aug. 6, 1998

Related U.S. Application Data

[63] Continuation-in-part of application No. 08/769,943, Dec. 19, 1996.

[51] Int. Cl.[7] .................................................... H02K 23/00
[52] U.S. Cl. ............................. 318/254; 318/439; 327/79
[58] Field of Search ...................................... 318/254, 139, 318/438; 327/79, 78, 77

[56] References Cited

U.S. PATENT DOCUMENTS

| | | | |
|---|---|---|---|
| 4,882,740 | 11/1989 | Abe et al. .................................... | 377/49 |
| 5,151,642 | 9/1992 | Lombardi et al. ....................... | 318/779 |
| 5,221,881 | 6/1993 | Cameron .................................. | 318/254 |
| 5,293,445 | 3/1994 | Carobolante ............................. | 388/813 |
| 5,294,877 | 3/1994 | Cameron .................................. | 318/809 |
| 5,306,988 | 4/1994 | Carobolante et al. ................... | 318/254 |
| 5,317,243 | 5/1994 | Cameron .................................. | 318/254 |
| 5,451,832 | 9/1995 | Cameron et al. ........................ | 318/375 |
| 5,455,885 | 10/1995 | Cameron .................................. | 388/834 |
| 5,481,167 | 1/1996 | Rohrbaugh et al. ..................... | 318/254 |
| 5,517,095 | 5/1996 | Carobolante et al. ................... | 318/254 |
| 5,616,996 | 4/1997 | Tang et al. ............................... | 318/439 |
| 5,619,109 | 4/1997 | Cameron et al. ........................ | 318/375 |
| 5,767,654 | 6/1998 | Menegoli et al. ....................... | 318/811 |

*Primary Examiner*—David Martin
*Attorney, Agent, or Firm*—Theodore E. Galanthay; Lisa K. Jorgenson; Robert D. McCutcheon

[57] ABSTRACT

A circuit and method for clocking counters in a polyphase dc motor is provided in which the motor is capable of operating at two or more operating states, spin-up and regulation. The system clock is connected to the clocking circuit through dividers to produce a first clock signal having a low frequency for operating the counter at spin-up, and a second clock signal having a higher frequency for operating the counter at regulation. The clocking circuit includes a switch for connecting the first clock signal to the clock input of the counter when the motor is at spin-up, and for connecting the second clock signal to the clock input when the motor is at regulation. The switch is controlled by a switch control circuit that ensures that switching does not occur when the counter is timing the motor by only allowing the switching to occur when the counter is at an end of a timing cycle and before the counter resets. An at-speed circuit is used to determine whether the motor is at spin-up or at regulation. A latching circuit is added to the at-speed circuit to latch its output to show that the motor is at regulation after the motor first enters regulation.

18 Claims, 5 Drawing Sheets

USING DIFFERENT FREQUENCY CLOCKS TO CLOCK COUNTERS OF A DRIVER CIRCUIT AT SPIN-UP AND AT REGULATION

CROSS-REFERENCE TO RELATED APPLICATIONS

This application is a continuation-in-part of pending application Ser. No. 08/769,943, filed Dec. 19, 1996.

TECHNICAL FIELD

The present invention relates to improvements in motor driving and controlling circuitry, and is more specifically related to an improved circuit and method for operating a counter for timing the periods of a polyphase direct current (dc) motor, or the like.

BACKGROUND

Three phase dc motors, particularly brushless, sensorless, three phase dc motors, are popular in drives in information retrieval systems that use rotating recording media, such as discs. Conventional disc drives are used to both record and to retrieve information. As discs become more prevalent as the medium of choice for storing information in both computer and home entertainment equipment, disc drives likewise become more prevalent and important components of such electronic systems.

In addition to the recording media, a disc drive typically includes a read/write assembly and a spindle motor assembly. The read/write assembly is adapted to transfer data between the disc and an external system, or device, such as a microprocessor. The spindle motor assembly carries the information storage discs and is arranged to rotate the discs.

Figure 1:
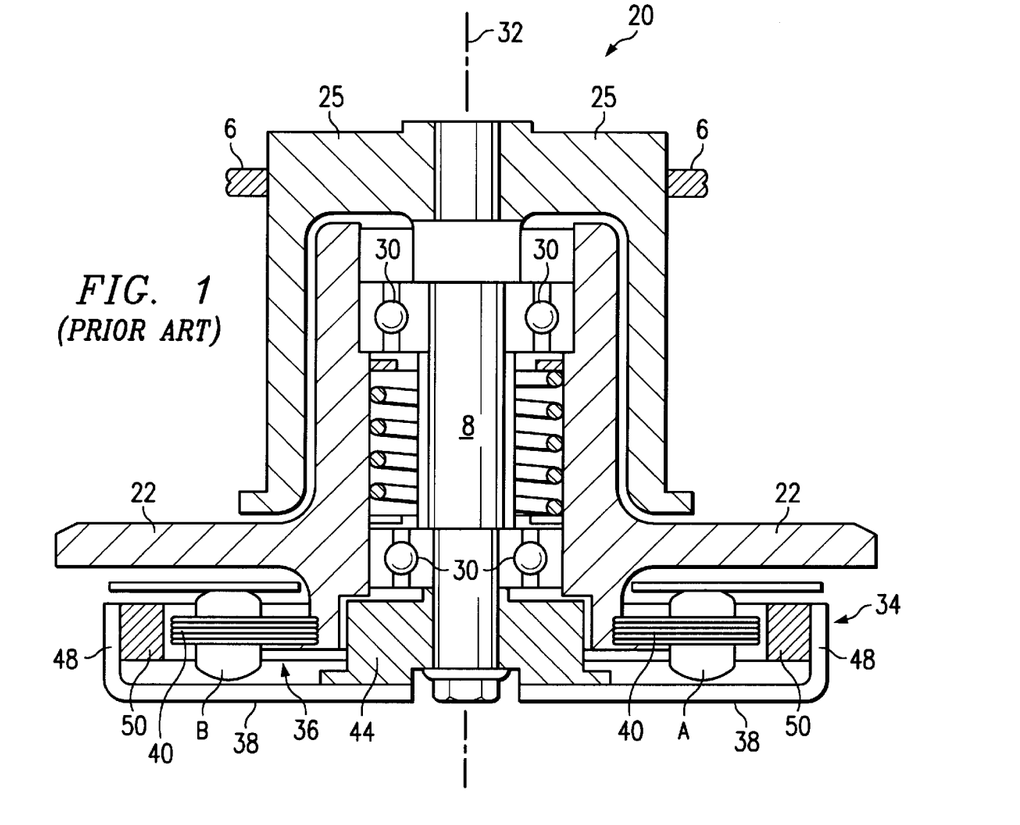
FIG. 1 is a circuit diagram of a spindle motor assembly used in disc drives.

FIG. 1 is a cross-sectional view of a conventional spindle motor assembly 20 used in disc drives. As depicted, the spindle motor assembly 20 includes a non-rotating spindle flange 22 which may be fastened to a disc drive housing, not shown. A rotatable spindle hub 25 is positioned over the spindle flange 22 and is carried by an elongated rotatable spindle shaft 8 that runs co-axially with the spindle hub 25 and the spindle flange 22. An information storage disc 6 can be positioned over spindle hub 25. The spindle shaft 8 is attached to a motor 34.

The motor 34 includes a stator assembly (or stator) 36 and a rotor assembly (or rotor) 38. The stator assembly 36 includes a plurality of lamination stacks 40 each having a corresponding coil wrapped thereabout. There are three such coils, which will be designated herein as coils A, B, and C, though only coils A and B are specifically shown in FIG. 1. Rotor assembly 38 is attached to spindle shaft 8 by a lower hub 44. The rotor assembly 38 includes a plurality of magnets 50 disposed about the interior surface of a flange 48.

During operation, coils A, B, and C are energized with a drive signal which causes electromagnetic fields to develop about the coils. The resulting attraction/repulsion between the electromagnetic fields of the coils A, B, and C and the magnetic fields created by the magnets 50 causes the rotor assembly 38 and the spindle shaft 8 to rotate about an axis 32. While rotating, the rotor assembly 38 causes a back emf signal to be generated in the coils A, B, and C due to the movement of the magnets 50 in relation to the coils A, B, and C.

Figure 2:
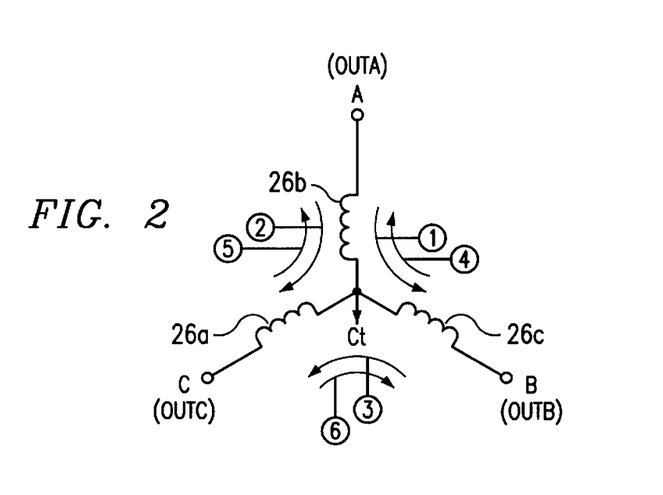
FIG. 2 is a representation of a conventional "Y" configuration coil arrangement.

The stator 36 can be viewed as having the three coils A, B, and C connected in a "Y" configuration, as shown in FIG. 2, although a larger number of stator coils are usually employed with multiple rotor poles. Typically, in such applications, eight pole motors are used having twelve stator windings and four N-S magnetic sets on the rotor, resulting in four electrical cycles per revolution of the rotor. The stator coils, however, can be analyzed in terms of three "Y" connected coils, connected in three sets of four coils, each physically separated by 90°.

The coils are energized in sequences to produce a current path through two coils of the "Y", with the third coil left floating, hereinafter floating coil FC. The sequences are arranged so that as the current paths are changed, or commutated, one of the coils of the current path is switched to float, and the previously floating coil is switched into the current path. The sequences are defined such that when the floating coil is switched into the current path, the direction of the current in the coil which was included in the prior current path is not changed. In this manner, six commutation sequences, or phases, are defined for each electrical cycle in a three phase motor, as shown in Table A.

TABLE A

| Phase | Current flows From: | To: | Floating Coil |
|---|---|---|---|
| 1 | A | B | C |
| 2 | A | C | B |
| 3 | B | C | A |
| 4 | B | A | C |
| 5 | C | A | B |
| 6 | C | B | A |

Figure 3:
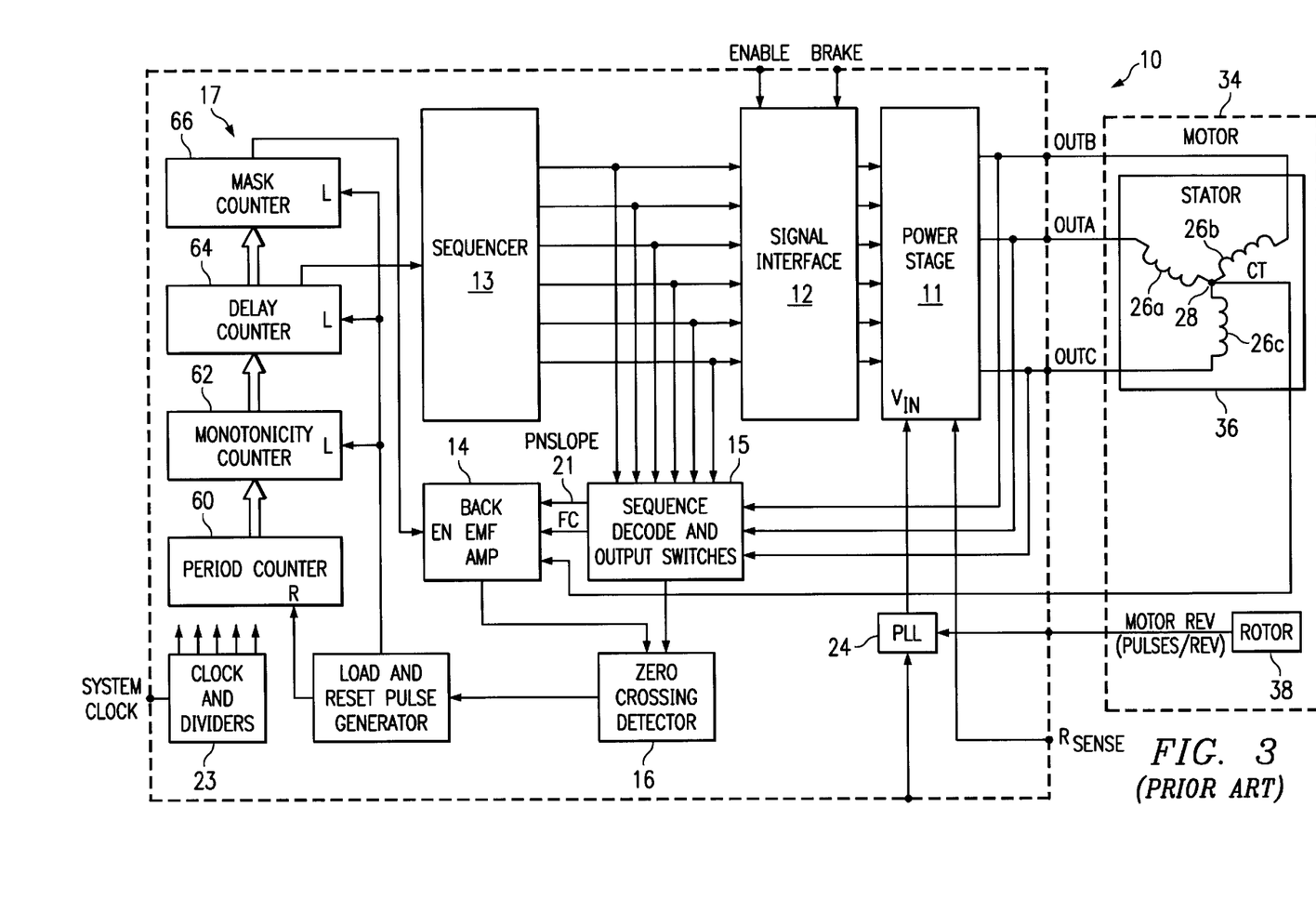
FIG. 3 is a circuit diagram, in block form, of a conventional motor and driver circuit.

FIG. 3 shows a typical architecture of the motor 34 and a driver circuit 10 that drives the motor 34. Individual elements shown in FIG. 3 are suitably made in accordance with prior practice, as described in detail in U.S. Pat. Nos. 5,317,243 and 5,294,877 which are fully incorporated into this specification by reference. Specifically, the motor 34 consists of the stator 36 driven by the driver circuit 10. Although the driver circuit 10 can be constructed of discrete components, preferably, the driver circuit 10 is integrated onto a single semiconductor chip adapted for connection to the stator coils 26a, 26b, and 26c of a three phase dc brushless spindle motor. The stator coils 26a, 26b, and 26c are connected to output nodes OUTA, OUTB, OUTC and CT.

A driving voltage is provided to the stator coils 26a, 26b, and 26c by a power stage 11, which is configured to have one high side driver HSA, HSB, and HSC (not shown) and one low side driver LSA, LSB, and LSC (not shown) for each of the stator coils 26a, 26b, and 26c. The power stage 11 is sequenced to provide sequential control output signals to the stator coils 26a, 26b, and 26c by a sequencer circuit 13. A signal interface circuit 12 supplies the output signals from the sequencer circuit 13 to the power stage 11, as well as enabling other functions, such as brake and output enable functions. The sequencer circuit 13 also provides drive signals to other circuits of the driver circuit 10 through sequence decode and output switches 15 to control the various aspects of rotation of the motor 34.

The stator coils 26a, 26b, and 26c are switchably connected to a back-emf sense amplifier 14. The back-emf sense amplifier 14 in turn delivers signals to a zero crossing detector 16, which provides input signals to a digital timing circuit 17. The timing circuit 17 measures the time between events in the back emf signal. The timing circuit 17 has four counters: a period counter 60, a monotonicity counter 62, a delay counter 64, and a mask counter 66. The output of the delay counter 64 of the timing circuit 17 controls the operation of the sequencer circuit 13.

The driver circuit 10 includes system clock circuitry 23, phase lock loop (PLL) frequency/phase detector circuitry 24, and may include various other circuitry, not shown, such as pulse width modulation (PWM) circuitry to support the PWM operation mode of the motor 34, "align and go" start up circuitry to facilitate the start up of the motor from a stopped condition, port control logic and associated shift register circuitry to facilitate control of the driver circuit 10 by an external microprocessor (not shown), and so forth.

One end of each of the stator coils 26a, 26b, and 26c is connected to a common center tap CT 28. The other end of each stator coil is connected to an output node, respectively designated OUTA, OUTB, and OUTC in FIG. 3. In operation, during an energized phase, one output node, for example node OUTA, is driven high by one of the high side drivers HSA. One output node, for example node OUTB, is driven low by one of the lower side drivers LSB. The third output node, for example node C, is left floating. This is commonly referred to as the "AB phase". The coils are then switched in a commutation sequence determined by the sequencer circuit 13 in a manner such that in each commutation phase current always flows in two of the three coils, with the third coil floating, and that after switching current will continue to flow, and in the same direction, in one of the two coils in which current was flowing in the previous phase to generate the six phases shown in Table A.

The switching of the driver transistors of the power stage 11 to effect the switching currents for each phase is accomplished by the sequencer circuit 13. The sequencer circuit 13 provides signals to the upper driver outputs and the lower driver outputs to accomplish the switching sequence outlined above in Table A.

The commutation among the stator coils 26a, 26b, and 26c is performed in response to information indicating the specific position of the rotor 38 of the motor 34 in conjunction with circuit information indicating the desired position of the rotor 38. More specifically, the commutation to apply the next drive sequence of Table A is determined in response to a corresponding coil reaching a particular rotational position and its correlation with sequencer information indicating where the motor 34 should be when a commutation is to occur. The determination of the precise rotational location of the rotor 38 is continuously being determined by monitoring the zero crossing voltage in each non-driven, or floating, stator coil. More particularly, as the stator coils 26a, 26b, and 26c are switched during the commutation sequence of the rotor 38, the voltage of the floating coil is monitored by the zero crossing detector 16.

During the operation of such a polyphase dc motor, maintaining a known position of the rotor 38 is an important concern. This can be implemented in various ways. One widely used way, for example, has been to start the motor in a known position, then derive information related to the instantaneous or current position of the rotor 38. Such instantaneous position information can be derived during the commutation process by identifying the floating coil and monitoring its back emf, that is, the emf induced into the coil as it moves through the magnetic field provided by the stator 36.

When the voltage of the floating coil crosses zero (referred to in the art as "a zero crossing"), the position of the rotor 38 is assumed to be known. Upon the occurrence of this event, the commutation sequence is incremented to the next phase, and the process repeated. The assumption that the zero crossing accurately indicates the rotor position is generally true if the motor 34 is functioning properly.

The sequence decode and output switches 15 includes switches connected to the stator coils 26a, 26b and 26c through the output nodes OUTA, OUTB, and OUTC to apply a selected one of the output nodes OUTA, OUTB, or OUTC (particularly the output node of the floating coil FC) to the non-inverting input of a comparator in the zero crossing detector 16. The particular one of the output nodes OUTA, OUTB or OUTC which is applied to the comparator corresponds to whichever of coils 26a, 26b, and 26c is expected to be floating (not the coil which is actually floating). Although the term "floating" is used herein to indicate the coil which is not in the instantaneous current path, the coil does not actually "float", but is connected to a tristate impedance.

The center tap connection CT 28 of the stator is connected to the inverting input of the comparator, so that when the voltage on the selected floating coil becomes larger than the center tap voltage, the comparator changes states, representing the zero crossing of the voltage on the selected floating coil. When the voltage on the floating coil becomes smaller than the center tap voltage, the comparator again changes states, representing the zero crossing of the voltage on the selected floating coil. (The voltage on the floating coil is the so-called the back emf of the floating coil.)

The timing circuit 17 measures the time between events in the back emf signal on the floating coil through the four counters: the period counter 60, the monotonicity counter 62, the delay counter 64, and the mask counter 66. The period counter 60 is an up counter that measures the time between successive zero crossings. The period counter 60 is used to determine whether the sequencing of drive pulses applied by the power stage 11 require adjustment, and if so, to initiate corrective action.

After the next successive zero crossing is detected, the count value of the period counter 60 is loaded into the monotonicity counter 62, the delay counter 64, and the mask counter 66, and the period counter 60 is reset in order to count the next period. The monotonicity counter 62, sometimes referred to as a deceleration counter, is a down counter that is used for diagnostic purposes, mainly to detect an abrupt deceleration or stoppage of the motor. The monotonicity counter 62 generally operates at a slower clock rate, such as one-half the rate of the period counter 60 (or operates to detect whether the count for the current period is substantially larger than the count of the previous period). If the monotonicity counter 62 reaches a predetermined count, such as zero, before the period counter 60 resets, a warning of a too-rapid deceleration is given.

The delay counter 64 is an up counter that provides a delay mechanism between the zero crossings and the engagement of the next commutation of the motor. This ensures that the commutation occurs when the torque is at or near its maximum. Typically, the delay time set for the delay counter 64 is about thirty electrical degrees, or around half of the period measured by period counter 60.

The mask counter 66 is an up counter that "masks" the zero detection capabilities in order to reduce or prevent the detection of false zero crossings which may occur due to noise generated under certain conditions, such as upon commutation of the drive between coil paris of the motor 34. A fairly clean back emf signal is needed to detect a true zero crossing. The mask counter disables the back emf amplifier 14 from detecting zero crossings when the mask signal output from the mask counter 66 is active. Typically, the mask time set for the mask counter 66 is about the three-fourths of a period measured by the period counter 60 and the mask period begins right after the detection of a zero crossing.

The delay counter 64 and the mask counter 66 assist in minimizing torque ripple and avoiding the detection of inaccurate signals.

Detection of a false zero crossing, missing the detection of a zero crossing, or incurring a delay in detecting a zero crossing can result in the disk drive read/write head being moved in a backward direction at spin-up. It can also produce jitter in the motor and can disrupt the speed control of the motor. All of this can cause damage to both the disc, the head, and/or the drive components.

One way to improve zero crossing detection in a driver circuit 10 is to improve the resolution of the counters associated with zero crossing detection. In current technology, each of the four counters, the period counter 60 shown in FIG. 4, the monotonicity counter 62, the delay counter 64, and the mask counter 66, includes a series of flip-flops.

To improve the resolution of a counter, the frequency of the clock used to drive the counter can be increased. However, this generally requires adding additional circuitry (additional flip-flops) to be able to detect zero crossings when the motor is spinning up. This increases the die area needed for the counter, and for the drive circuit, and therefore increases the cost of the chip. This goes against some of the central goals of the semiconductor industry to reduce cost and increase the speed of the chip. A low frequency clock would allow a reduction in the number of flip-flops but would not provide high enough resolution in the counters to detect zero crossings. In current technology, an intermediate frequency clock and an intermediate length of flip-flops is used.

SUMMARY OF THE INVENTION

According to the present invention, there is provided a circuit for measuring a time period between detection of zero crossings of a back electromagnetic force (bemf) signal in a polyphase direct current (dc) motor. The circuit includes a counter for counting in response to a detection of a first zero crossing of the bemf signal. The counter has a clock input for receiving a clocking signal for clocking the counter. The circuit also includes a first circuit receives a first clock signal having a first frequency or a second clock signal having a second frequency and couples the first clock signal to the clock input of the counter in response to the motor operating at a first operating state and couples the second clock signal to the clock input in response to the motor operating at a second operating state.

In another embodiment of the present invention, there is provided a disc drive including a polyphase dc motor having two or more operating states and a circuit for measuring a time period between detection of zero crossings of a back electromagnetic force (bemf) signal in a polyphase direct current (dc) motor. The circuit includes a counter for counting in response to a detection of a first zero crossing of the bemf signal. The counter has a clock input for receiving a clocking signal for clocking the counter. The circuit also includes a first circuit receives a first clock signal having a first frequency or a second clock signal having a second frequency and couples the first clock signal to the clock input of the counter in response to the motor operating at a first operating state and couples the second clock signal to the clock input in response to the motor operating at a second operating state.

In yet another embodiment of the present invention, there is provided a method of counting periods in a polyphase dc motor that operate at a spin-up operating state and a regulation operating state and includes a driver circuit having a counter with a clock input. The method includes the steps of determining the operating state of the motor, coupling the clock input of the counter to a first clock signal when the motor is in the spin-up operating state, and coupling the clock input of the counter to a second clock signal when the motor is in the regulation operating state.

BRIEF DESCRIPTION OF THE DRAWINGS

For a more complete understanding of the present invention, and the advantages thereof, reference is made to the following description taken in conjunction with the accompanying drawings, wherein.

DETAILED DESCRIPTION

With reference to the drawings, like reference characters designate like or similar parts throughout the drawings.

Figure 5:
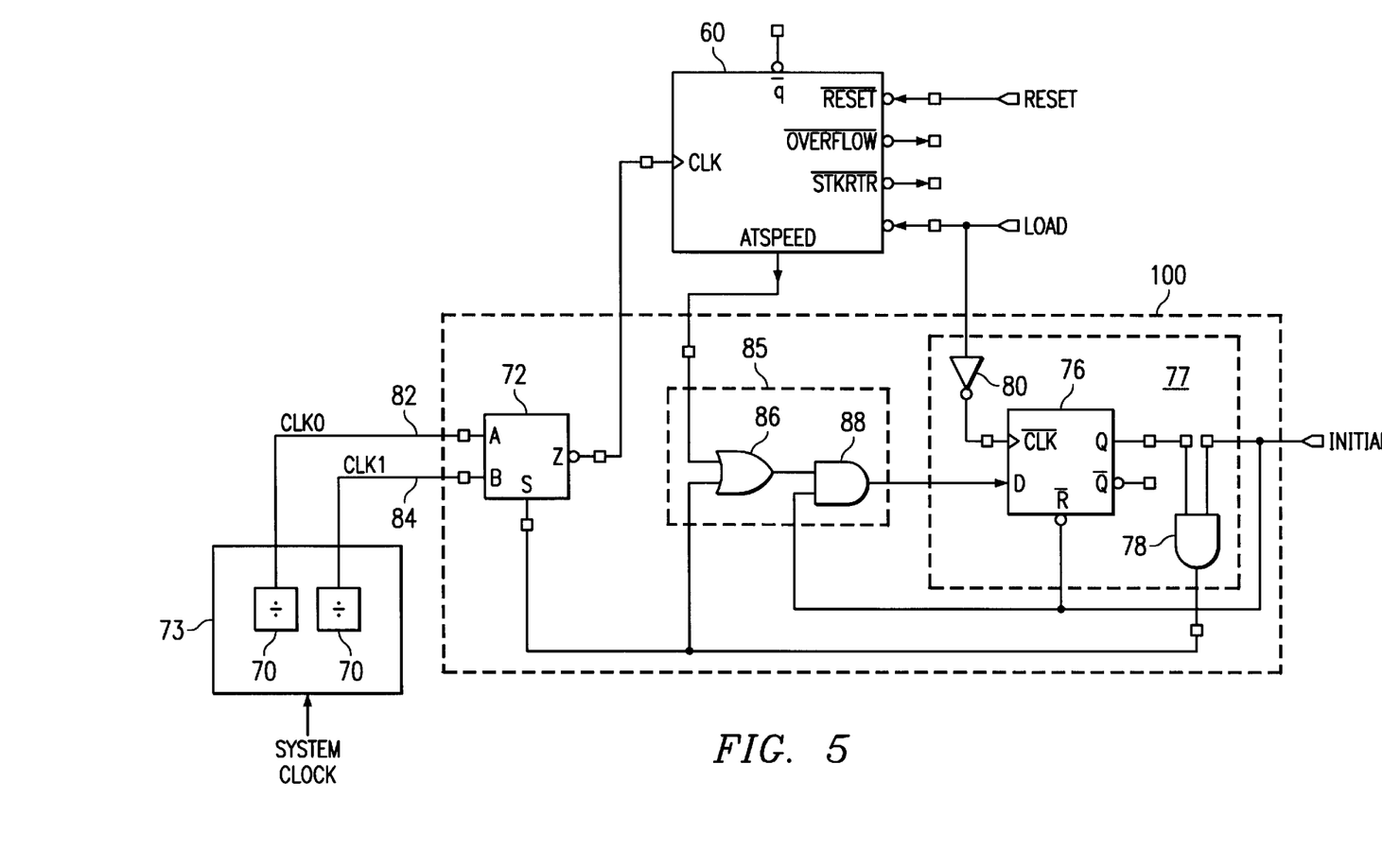
FIG. 5 is a detailed circuit diagram of an embodiment of the present invention.

Referring to FIG. 5, a clocking circuit according to an embodiment of the invention is designated generally by reference numeral 100. The clocking circuit 100 is typically included in the timing circuitry 17' of a motor driver circuit 10' of a polyphase dc motor, as shown in FIG. 6.

Figure 6:
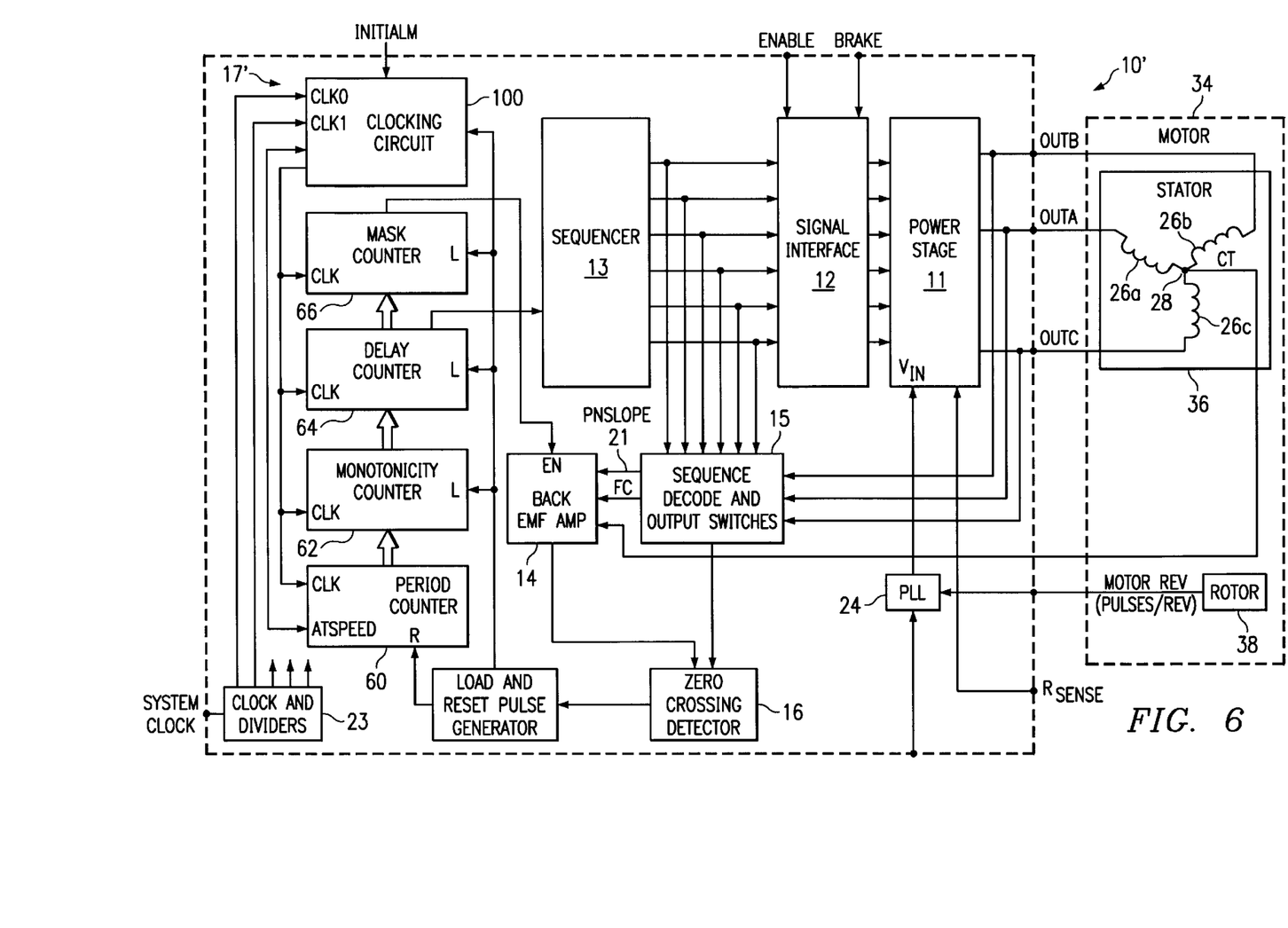
FIG. 6 is a circuit diagram, in block form, of a motor and motor driver circuit having a clocking circuit according to an embodiment of the present invention.

Referring to FIG. 6, the driver circuit 10' is like the conventional driver circuit 10 with the addition of the clocking circuit 100. The driver circuit 10' preferably is integrated into a single semiconductor chip adapted for connection to the stator coils 26a, 26b, and 26c of a three phase dc brushless spindle motor 34, although the driver circuit 10' can be constructed of discrete components. The stator coils 26a, 26b, and 26c of the motor 34 are connected to output nodes OUTA, OUTB, OUTC and CT. One end of each of the stator coils 26a, 26b, and 26c is connected to a common center tap CT 28. The other end is connected to respective output nodes OUTA, OUTB, and OUTC.

A driving voltage is provided to the stator coils 26a, 26b, and 26c by a power stage 11, which is typically configured to have one high side driver HSA, HSB, and HSC (not shown) and one low side driver LSA, LSB, and LSC (not shown) for each of the stator coils 26a, 26b, and 26c. The power stage 11 is sequenced to provide sequential control output signals to the stator coils 26a, 26b, and 26c by a sequencer circuit 13. A signal interface circuit 12 supplies the output signals from the sequencer circuit 13 to the power stage 11, as well as enabling other functions, such as brake and output enable functions. The sequencer circuit 13 also provides drive signals to other circuits of the controller circuitry to control the various aspects of rotation of the motor driven by the driver circuit 10' through sequence decode and output switches 15. The output node of the floating coil FC, such as output node OUTA when the phase is BC, is coupled to the zero crossing detector 16 through the sequence decode and output switches 15.

The driver circuit 10' includes system clock circuitry 23 with a driver clock input connected to the system clock, phase lock loop (PLL) frequency/phase detector circuitry 24, and may include various other circuitry, not shown, such as a PWM drive to support the PWM operation of the motor, "align and go" start up circuitry to facilitate start up of the motor from a stopped condition, port control logic and associated shift register circuitry to facilitate control of the driver circuit 10' by an external microprocessor (not shown), and so forth.

The switching of the high and low side drivers of the power stage 11 to effect the switching currents for each phase is accomplished by the sequencer circuit 13. The sequencer circuit 13 provides signals to the upper driver outputs and the lower driver outputs to accomplish the switching sequence outlined above in Table A.

The stator coils 26a, 26b, and 26c are switchably connected to a back-emf sense amplifier 14, typically a buffer, through output nodes OUTA, OUTB, and OUTC. The back-emf sense amplifier 14 delivers signals to the zero crossing detector 16, which provides input signals to a digital timing circuit 17'. The output of the delay counter 64 of the timing circuit 17' controls the operation of the sequencer circuit 13.

The motor is capable of operating at two of more operating speeds, spin-up and regulation. The motor is initialized and spins up to regulation speed. During spin-up, when the motor first spins up, the period between zero crossings is long. The period between zero crossings decreases as the motor spins up to regulation speed, and stays relatively constant during regulation.

Although FIG. 6 shows one embodiment of the driver circuit 10', any conventional driver circuit of a polyphase dc motor 34 may be employed provided that it is capable of operating at more than one operating speed, uses counters that require high resolution, and has a significant difference in the period that the counters time during different operation modes of the motor 34. The invention is particularly useful for a driver circuit that uses zero crossings to determine the position of the rotor, and that uses counters in the timing circuitry to time or regulate the commutations, and to measure the time between zero crossings.

FIG. 5 shows the preferred clocking circuit 100 connected to the period counter 60. A switch 72, preferably a multiplexer (MUX), connects a first input 82 or a second input 84 to the clock input CLK of the period counter 60. The first input 82 and the second input 84 receive a CLK0 and CLK1 clock signals, respectively, from the system clock circuitry 23. Referring to FIGS. 5 and 6 simultaneously, the switch 72 connects the CLK0 clock signal or the CLK1 clock signal to the clock inputs of the counters 60, 62, 64, 66 in the timing circuit 17'.

The CLK0 and CLK1 clock signals are generated by the clock and dividers 23 of the driver circuit 10'. A system clock is input to the clock and dividers 23. The system clock typically has a frequency of about 20 MHz. As will be appreciated, the system clock frequency may be higher or lower depending on the specifics of operation of the motor. In the preferred embodiment, the clock and dividers 23 include one or more divider circuits 70 for generating additional clock signals CLK0 and CLK1 from the system clock, as shown. In the preferred embodiment, the CLK0 signal has a frequency of about 312 KHz (period of about 3.2 microseconds) and the CLK1 signal has a frequency greater than the frequency of the CLK0 signal. Preferably, this frequency is in the range of between 1-3 MHz, and most preferred at about ten times the frequency of the CLK0 signal. As will be understood, the frequencies of the system clock and the CLK0 and CLK1 signals will depend on several factors, including the desired operating speed of the motor, the period between zero crossings (e.g., 24 periods per revolution for an 8-pole motor and 36 periods per revolution for a 12-pole motor), the size of the counters, and/or the desired resolution. It will also be understood that the two clock signals CLK0 and CLK1 can be provided from external source(s) and used as inputs to the switch 72.

Referring to FIG. 5, the clocking circuit 100 includes the switch (or MUX) 72, a switch control circuit 77 and a latching circuit 85. An select signal output from the switch control circuit 77 controls the selection of the CLK0 signal or the CLK1 signal as the output CLK signal from the MUX 72.

The switch control circuit 77 includes a D-type flip-flop 76, an AND gate 78, and an inverter 80. The LOAD signal (generated when a zero crossing is detected) is input to the inverter 80 with the output thereof utilized as the clocking input to the D-type flip-flop 76. The Q output of the flip-flop 76 is one of two inputs to the AND gate 78. The other input is an INITIALM signal. The INITIALM signal indicates whether the motor is initialized. The flip-flop 76 is clocked by a rising edge of the inverted LOAD signal generated by the load and reset pulse generator (see FIG. 6). The input of the flip-flop 76 is connected to the output of the latching circuit 85.

The latching circuit 85 includes an OR gate 86 having an ATSPEED signal as one input and the output of the AND gate 78 as the other input. The output of the OR gate 86 provides one input of an AND gate 88, and the INITIALM signal provides the other input of the AND gate 88. The ATSPEED signal preferably is the ATSPEED signal of the period counter 60, and is active when the motor is operating at or near the desired normal operating speed (i.e. regulation). Alternatively, any at-speed signal that indicates whether the operating state of the motor is spin-up or regulation can be used.

Figure 4:
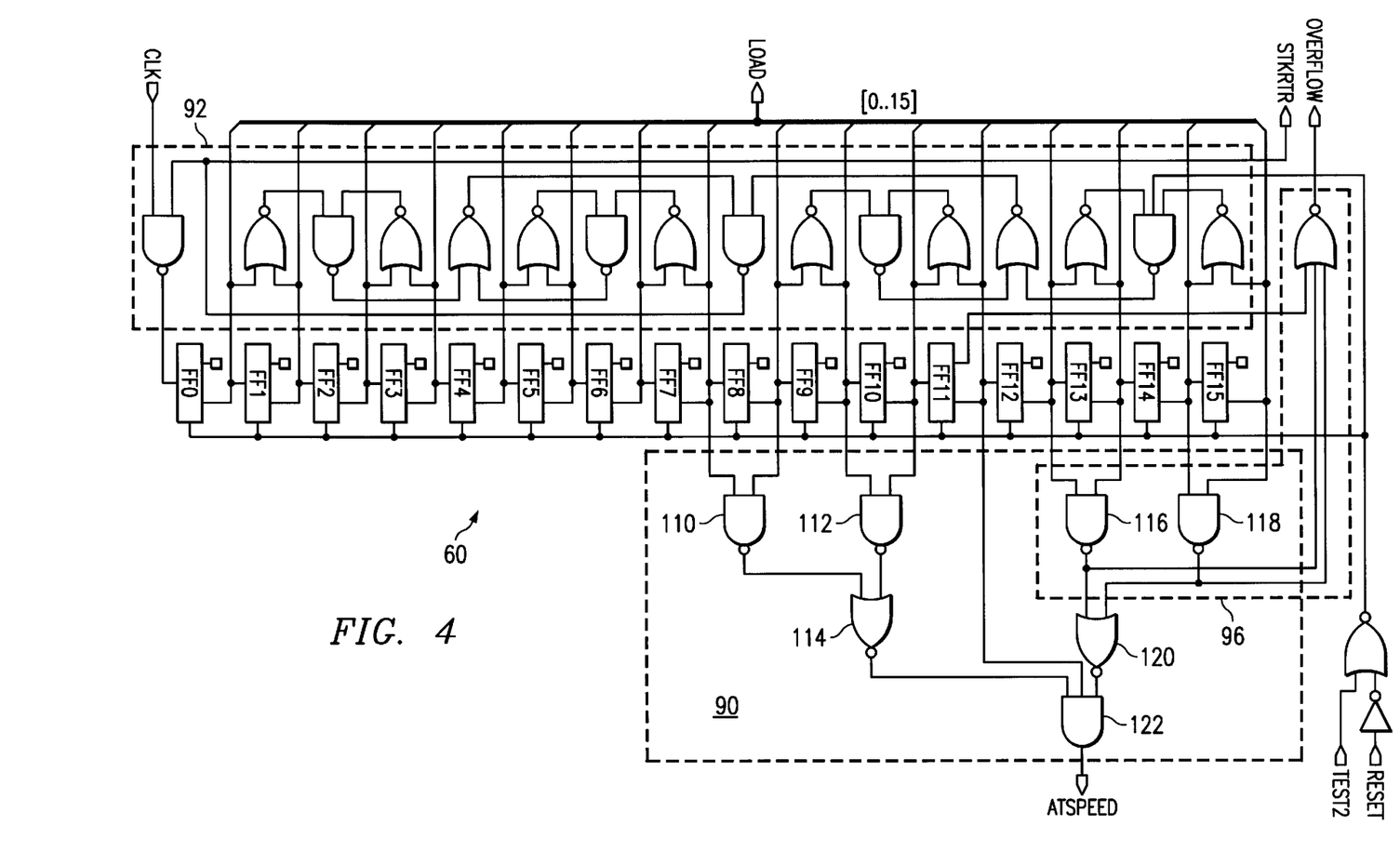
FIG. 4 is a circuit diagram of a period counter.

FIG. 4 illustrates the period counter 60 in more detail. The period counter 60 is an up-counter having a chain of counter flip-flops FF0 through FF15 clocked by a clock signal received on the clock input CLK. The inverted outputs of each of the counter flip-flops are connected to a stuck-rotor circuit 92 that produces the STKRTR signal. The STKRTR signal indicates that the rotor is not moving and the stuck-rotor circuit 92 stops the period counter 60. Outputs of the five counter flip-flops FF11 through FF15 at the end of the flip-flop chain are connected to the overflow circuit 96 that produces an OVERFLOW signal.

When the motor is in regulation, not all of the flip-flops are used for the period counter 60 to time the period between zero crossings when the period counter 60 is clocked by the first clock signal CLK0. One skilled in the art can determine the number of flip-flops at the beginning of the flip-flop chain that are clocked when timing the period between zero crossings using the characteristics of the motor, the characteristics of the flip-flops, and the frequency of the first clock signal CLK0. The flip-flops at the end of the flip-flop chain that are not clocked when timing the period between zero crossings are connected to an at-speed circuit 90. The at-speed circuit 90 determines when these flip-flops are no longer clocked when timing the period between zero crossings.

Any at-speed circuit that can determine when these (or other) flip-flops are not clocked, when timing the period between zero crossings, can be used. One way of determining this is to check if the inverting outputs of all of the flip-flops past a certain point in the flip-flop chain is set to the high logic state generated on the flip-flops by the RESET signal. The at-speed circuit 90 in FIG. 4 is one example of such a circuit. Nine flip-flops FF7 through FF15, at the end of the flip-flop chain, are connected to the at-speed circuit 90 to produce the ATSPEED signal. The at-speed circuit 90 includes four NAND gates 110, 112, 116, 118 each having the inverting output of two counter flip-flops FF7 and FF8, FF9 and FF10, FF12 and FF13, and FF14 and F15 respectively, as their inputs. The outputs of the first and second NAND gates 110, 112 are connected as inputs to a first NOR gate 114, and the outputs of the third and fourth NAND gates 116, 118 are connected as the inputs to a second NOR gate 120. The outputs of the two NOR gates 114, 120 and the inverting output of the flip-flop FF11 (not connected to a NAND gate) are input to an AND gate 122. The output of the AND gate 122 is the ATSPEED signal which is active when the motor is operating at or near the desired normal operating speed (i.e. regulation).

In a conventional driver circuit, the flip-flops which are not clocked when timing the period between the zero crossings just stand idle. In the present invention, the clock frequency is increased and all or most of the flip-flops FF0 through FF15 are used, increasing the resolution of the counter. The latching circuit 85, shown in FIG. 5, is utilized to ensure that the at-speed circuit 90 does not change the ATSPEED signal at this point and that the ATSPEED signal continues to show that the motor is at, or close to, regulation.

Referring to FIG. 4 and FIG. 5 simultaneously, the operation of the invention will now be described. Before the motor is initialized, the INITIALM signal is low, resetting the flip-flop 76, producing a low logic state at its output. Both the low on INITIALM signal and at the output of the flip-flop 76 produce a low at the output of the AND gate 78 which is input to the MUX 72, thereby selecting the first input 82 and connecting the first clock signal CLKO to the clock input CLK of the period counter 60. Additionally, the INITIALM signal also brings the output of the AND gate 88 low to produce a low on the input of the flip-flop 76 when it is first clocked.

Before the motor is started the counters 60, 62, 64, 66 are reset. The LOAD signal is brought low clocking the flip-flop 76 to produce a low output. A short time later (typically a few nanoseconds), the RESET signal is activated low, resetting the counter flip-flops FF0 through FF15, producing a high on the inverted output of the counter flip-flops FF0 through FF15. This produces the ATSPEED signal with a high level. However, the output of the AND gate 88 is still low due to the low INITIALM signal, keeping the input of the flip-flop 76 low.

When the motor is started, the INITIALM signal is activated high, bringing the output of the AND gate 88 and the input of flip-flop 76 high. However, the flip-flop 76 is not clocked since the LOAD signal is not brought low until the first zero crossing is detected. Therefore, the output of flip-flop 76 remains low, keeping the output of the AND gate 78 low and the first clock signal CLK0 connected to the clock input CLK of the period counter 60.

The frequency of the first clock signal CLK0 is generally a divided system clock frequency. In current technology the system clock frequency is on the order of 20 MHz and the frequency of the first clock signal CLK0 is typically about 312 KHZ or 156 kHz. The motor starts spinning slowly and the counter 60 utilizes all or a majority of the counter flip-flops FF0 through FF15 to count the time between the zero crossings, even at the comparatively low frequency. Therefore, all or most of the counter flip-flops FF0 through FF15 toggle causing the at-speed circuit 90 and the latching circuit 85 to produce a low on the ATSPEED signal. This produces a low at the output of the OR gate 86, and therefore a low on the output of the AND gate 88, bringing the input of the flip-flop 76 low.

The period counter 60 is reset after the detection of every zero crossing by bringing the RESET signal low (and then bringing it back high to allow for the normal operation of the counters). The RESET signal activation occurs successive to the generation of the LOAD signal (which is generated when a zero crossing is detected). The LOAD signal is brought low and high several nanosecond before the RESET signal. Each time the LOAD signal is brought low the flip-flop 76 is clocked. The logic state on the input of the flip-flop 76 is the logic state of the low that is on the ATSPEED signal right before the counter flip-flops FF0 through FF15 are reset, keeping the output flip-flop 76 and therefore of the AND gate 78 low and the first clock signal CLK0 connected to the clock input CLK. Resetting the counter flip-flops FF0 through FF15 produces a high on the inverted output of the counter flip-flops FF0 through FF15, producing a high on the ATSPEED signal. However, the flip-flop 76 is not clocked since the LOAD signal is not brought low until the detection of the next zero crossing. The output of flip-flop 76 remains low, keeping the output of the AND gate 78 low and the clock signal CLK0 connected to the clock input CLK.

Because the motor is still spinning slowly enough that the counter needs most of the counter flip-flops FF0 through FF15 to count the time between the zero crossings, some of the counter flip-flops FF0 through FF15 toggle causing the at-speed circuit 90 to produce a low on the ATSPEED signal when the LOAD signal is sent. This keeps the output of the AND gate 78 low and the clock signal CLK0 connected to the clock input CLK.

As the speed of the motor increases, the number of counter flip-flops FF0 through FF15 needed to time the period between zero crossings decreases. Eventually (and based on the frequency of the clock and the motor characteristics), the period counter 60 will only utilize the first seven counter flip-flops FF0 through FF6 to count the period between zero crossings. As will be appreciated, the number of counter flip-flops utilized at regulation speed is based on several factors, including the frequency of the clock and the characteristics of the motor. The remaining flip-flops FF7 through FF15 will continue to remain at the state generated by the RESET signal. They will continue to remain high, producing a high on the ATSPEED signal, and therefore at the input of the flip-flop 76. The next LOAD pulse clocks the flip-flop 76 and produces a high at the output of the AND gate 78. This switches the output of the MUX 72 to the second input 84, and therefore the second clock signal CLK1 is input to the period counter 60. Using the LOAD signal to clock the flip-flop 76 ensures that the clock frequency is only switched after a zero crossing and before the period counter 60 resets. This eliminates the possibility that the clock frequency will change while the counter is timing the period between zero crossing, which may throw off the timing.

Once the ATSPEED signal remains high during the pulse of the LOAD signal, the output of the AND gate 78 is brought high, bringing the input of the OR gate 86 high, which produces a high at the output of the AND gate 88 and latches the input of the flip-flop 76. This latches the AND gate 78 high keeping the clock signal CLK1 connected to the clock input CLK of the period counter 60. This continues until the motor is shut down bringing the INITIALM low and resetting the latching circuit 85 and the flip-flop 76.

Switching the frequency of the clock to a higher frequency allows all of the counters 60, 62, 64, and 66 to utilize all of their flip-flops, increasing the resolution of the counters. This provides several advantages. A counter with the same number of flip-flops can be used to produce higher resolution at regulation than a counter whose clock only functions at one frequency. Alternatively, a counter with fewer flip-flops can be used to achieve the same resolution at regulation as a counter with only one frequency, saving die space and reducing the cost of the circuit. Both of these are accomplished while still keeping the clock frequency at spin-up low enough not to miss any zero crossings.

It should be noted that although a preferred embodiment of the invention is described with regard to a three phase motor, in particular, the principles of the invention can be equally advantageously applied to polyphase motors, in general.

Although the invention has been specifically described with reference to several preferred and alternative embodiments, it will be understood by those skilled in the art having reference to the current specification and drawings that various modifications may be made and further alternatives are possible without departing from the spirit and scope of the invention as set forth in the appended claims.

What is claimed is:

1. A circuit for measuring a time period between detection of zero crossings of a back electromagnetic force (bemf) signal in a polyphase direct current (dc) motor, the circuit comprising:
   a counter operable for counting in response to a detection of a first zero crossing of the bemf signal, and operable for outputting a count from the counter in response to a detection of a second zero crossing of the bemf signal, the count representing the period between the first and second zero crossings, and the counter having a clock input receiving a clocking signal for clocking the counter; and
   a first circuit for receiving a first clock signal having a first frequency and a second clock signal having a second frequency and coupling the first clock signal to the clock input of the counter in response to the motor operating at a first operating state and coupling the second clock signal to the clock input in response to the motor operating at a second operating state.

2. The circuit in accordance with claim 1 further comprising a switch control circuit for preventing the first circuit from decoupling the first clock signal to the clock input of the counter and coupling the second clock signal to the clock input of the counter when the counter is counting.

3. The circuit in accordance with claim 2 wherein the switch control circuit comprises:
   circuitry for switching from coupling the first clock signal to the clock input to coupling the second clock signal to the clock input when a load signal indicates that the timing cycle for timing the motor is at an end and for switching from coupling the first clock signal to the clock input to coupling the second clock signal to the clock input when an initial motor signal indicates the motor is initialized.

4. The circuit in accordance with claim 3 wherein the circuitry for switching comprises:
   a flip-flop having one input coupled to an ATSPEED signal indicating the motor is operating substantially at regulation speed, having a reset input coupled to the initial motor signal, and having a clocking input coupled to the load signal, the flip-flop having an output; and
   an AND gate having one input coupled to the output of the flip-flop and another input coupled to the initial motor signal.

5. The circuit in accordance with claim 1 further comprising a latch control circuit having an output signal coupled to the first circuit, and for latching the logic state of an ATSPEED signal generated when the motor is operating substantially at regulation speed.

6. The circuit in accordance with claim 5 wherein the latching circuit comprises:
   an OR gate; and
   an AND gate for ensuring that the switching from coupling the first clock signal to the clock input to coupling the second clock signal to the clock input does not occur when an initial motor signal indicates the motor is not initialized.

7. The circuit in accordance with claim 1 wherein the first operating state occurs during spin-up of the motor, the second operating state is regulation of the motor, and the frequency of the first clocking signal is less than the frequency of the second clocking signal.

8. The circuit in accordance with claim 7 wherein the first circuit comprises a multiplexer.

9. The circuit in accordance with claim 1 further comprising circuitry for generating an ATSPEED signal when the motor is operating substantially at regulation, and wherein the first circuit couples the second clocking signal to the clock input of the counter in response to the ATSPEED signal.

10. A disc drive comprising:
    a polyphase dc motor having two or more operating states;
    a counter operable for counting in response to a detection of a first zero crossing of the bemf signal, and operable for outputting a count of the counter in response to a detection of a second zero crossing of the bemf signal, the count representing the period between the first and second zero crossings, and the counter having a clock input receiving a clocking signal for clocking the counter; and
    a first circuit for receiving a first clock signal having a first frequency and a second clock signal having a second frequency and coupling the first clock signal to the clock input of the counter in response to the motor operating at a first operating state and coupling the second clock signal to the clock input in response to the motor operating at a second operating state.

11. The circuit in accordance with claim 10 wherein the first operating state occurs during spin-up of the motor, the second operating state is regulation of the motor, and the frequency of the first clocking signal is less than the frequency of the second clocking signal.

12. The circuit in accordance with claim 11 wherein the first circuit comprises a multiplexer.

13. The circuit in accordance with claim 10 further comprising circuitry for generating an ATSPEED signal when the motor is operating substantially at regulation, and wherein the first circuit couples the second clocking signal to the clock input of the counter in response to the ATSPEED signal.

14. The circuit in accordance with claim 10 further comprising a switch control circuit for preventing the first circuit from decoupling the first clock signal to the clock input of the counter and coupling the second clock signal to the clock input of the counter when the counter is counting.

15. The circuit in accordance with claim 14 wherein the switch control circuit comprises:

circuitry for switching from coupling the first clock signal to the clock input to coupling the second clock signal to the clock input when a load signal indicates that the timing cycle for timing the motor is at an end and for switching from coupling the first clock signal to the clock input to coupling the second clock signal to the clock input when an initial motor signal indicates the motor is initialized.

16. A method of counting periods in a polyphase dc motor capable of operating at a spin-up operating state and a regulation operating state and having a driver circuit including a counter having a clock input, comprising the steps of:

determining the operating state of the motor;

counting the counter in response to a detection of a first zero crossing of a back electromotive force (bemf) signal;

outputting a count of the counter in response to a detection of a second zero crossing of the bemf signal, the count representing the period between the first and second zero crossings;

coupling the clock input of the counter to a first clock signal when the motor is in the spin-up operating state; and coupling the clock input of the counter to a second clock signal when the motor is in the regulation operating state.

17. The method in accordance with claim 16 wherein the first clock signal has a first frequency and the second clock signal has a second frequency and the first frequency is less than the second frequency.

18. The method in accordance with claim 16 further comprising resetting the counter in response to the detection of the second zero crossing.

* * * * *